(12) United States Patent
Grauer et al.

(10) Patent No.: US 9,810,785 B2
(45) Date of Patent: Nov. 7, 2017

(54) GATED IMAGING USING AN ADAPTIVE DEPTH OF FIELD

(71) Applicant: BRIGHTWAY VISION LTD., Haifa (IL)

(72) Inventors: Yoav Grauer, Haifa (IL); Ofer David, Haifa (IL); Eyal Levi, Haifa (IL); Ya'ara David, Kiryat Tiv'on (IL); Haim Garten, Haifa (IL); Alon Krelboim, Haifa (IL); Sharon Lifshits, Haifa (IL); Oren Sheich, Yoqneam (IL)

(73) Assignee: BRIGHTWAY VISION LTD., Haifa (IL)

( * ) Notice: Subject to any disclaimer, the term of this patent is extended or adjusted under 35 U.S.C. 154(b) by 389 days.

(21) Appl. No.: 14/404,009

(22) PCT Filed: May 23, 2013

(86) PCT No.: PCT/IL2013/050448
§ 371 (c)(1),
(2) Date: Nov. 26, 2014

(87) PCT Pub. No.: WO2013/179280
PCT Pub. Date: Dec. 5, 2013

(65) Prior Publication Data
US 2015/0160340 A1    Jun. 11, 2015

Related U.S. Application Data

(60) Provisional application No. 61/652,518, filed on May 29, 2012.

(51) Int. Cl.
*G01C 3/08*    (2006.01)
*G01S 17/08*   (2006.01)
(Continued)

(52) U.S. Cl.
CPC ............ *G01S 17/08* (2013.01); *G01S 7/4802* (2013.01); *G01S 7/486* (2013.01); *G01S 17/107* (2013.01);
(Continued)

(58) Field of Classification Search
CPC ........ G01S 17/08; G01S 7/4802; G01S 7/486; G01S 17/107; G01S 17/50; G01S 17/88;
(Continued)

(56) References Cited

U.S. PATENT DOCUMENTS 5,270,780 A    12/1993  Moran et al.
5,302,819 A *   4/1994  Kassies ................. G01S 7/4802
                                                    250/222.1
(Continued)

FOREIGN PATENT DOCUMENTS

IL    WO2011107987    *  9/2011
JP       2010061304       3/2010
(Continued)

OTHER PUBLICATIONS

Supplementary European Search Report for Application No. 13797348.3, dated Nov. 6, 2015.
(Continued)

*Primary Examiner* — Samantha K Abraham
(74) *Attorney, Agent, or Firm* — Pearl Cohen Zedek Latzer Baratz LLP

(57) ABSTRACT

A method for gated imaging using an adaptive depth of field is provided herein. The method includes obtaining boundary conditions associated with a preliminary depth of field (DOF) parameters in a scene; illuminating the scene, using a light source, with a pulsed light beam, based on the specified boundary conditions; controlling sensor array parameters based on the boundary conditions; capturing, using the sensor array, one or more images of the scene,
(Continued)

wherein the capturing is based on one or more exposures synchronized with the pulsed light beam, to achieve gated images of the scene in accordance with the boundary conditions associated with the DOF parameters; analyzing at least one of the captured images, using data processing algorithms, to yield updated DOF parameters; and repeating the above stages with updated sensor array parameters and updated light source parameters, based on the updated DOF parameters and updated boundary conditions.

21 Claims, 23 Drawing Sheets

(51) Int. Cl.
| | |
|---|---|
| G01S 17/89 | (2006.01) |
| G01S 17/10 | (2006.01) |
| G01S 17/93 | (2006.01) |
| G01S 17/50 | (2006.01) |
| G01S 7/48 | (2006.01) |
| G06K 9/00 | (2006.01) |
| G01S 7/486 | (2006.01) |
| G01S 17/88 | (2006.01) |
| G01S 17/02 | (2006.01) |

(52) U.S. Cl.
CPC .............. *G01S 17/50* (2013.01); *G01S 17/88* (2013.01); *G01S 17/89* (2013.01); *G01S 17/936* (2013.01); *G06K 9/00805* (2013.01); *G01S 17/023* (2013.01)

(58) Field of Classification Search
CPC ...... G01S 17/89; G01S 17/936; G01S 17/023; G06K 9/00805
See application file for complete search history.

(56) References Cited

U.S. PATENT DOCUMENTS

| | | | | |
|---|---|---|---|---|
| 5,699,147 | A | * | 12/1997 | Yamamoto ............ B65H 16/02 226/18 |
| 2004/0080450 | A1 | | 4/2004 | Cheong |
| 2007/0058038 | A1 | | 3/2007 | David et al. |
| 2008/0089557 | A1 | * | 4/2008 | Iwaki ...................... G01C 3/06 382/106 |
| 2009/0141260 | A1 | | 6/2009 | Kitano |
| 2010/0026850 | A1 | | 2/2010 | Katz |
| 2012/0050074 | A1 | | 3/2012 | Bechtel et al. |
| 2012/0075534 | A1 | | 3/2012 | Katz et al. |

FOREIGN PATENT DOCUMENTS

| | | |
|---|---|---|
| JP | 2011-121398 | 6/2011 |
| WO | WO 2011/107987 | 9/2011 |

OTHER PUBLICATIONS

Chinese Office action for Application No. 2013800290224, dated Mar. 2, 2016.
International Search Report for International App. No. PCT/IL2013/050448, dated Aug. 28, 2013.

* cited by examiner

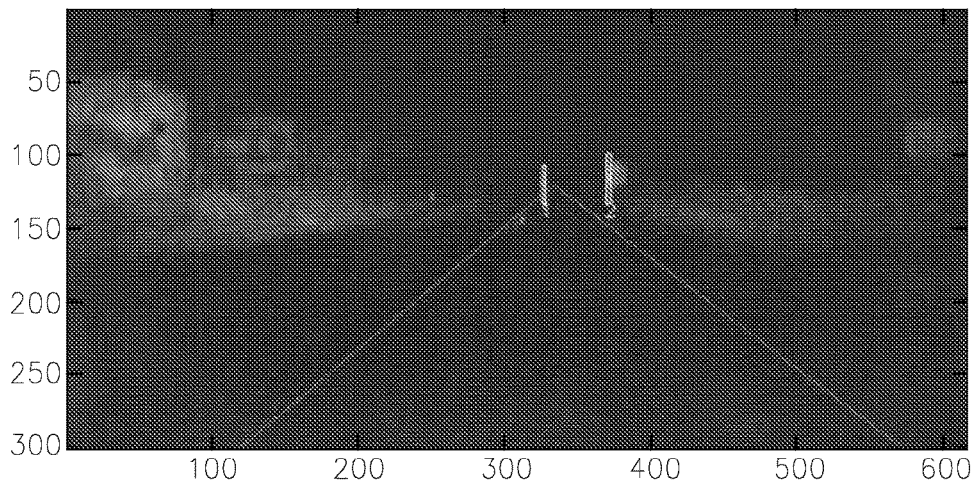
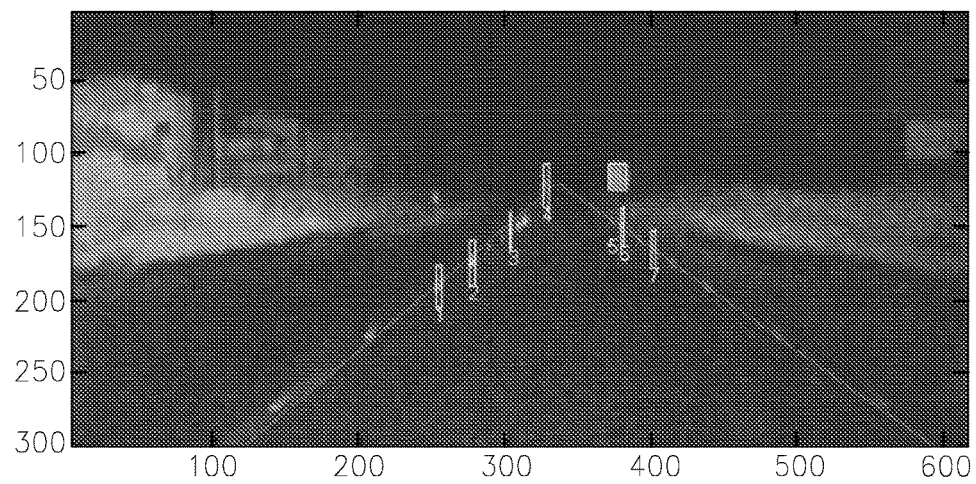
Figure 6

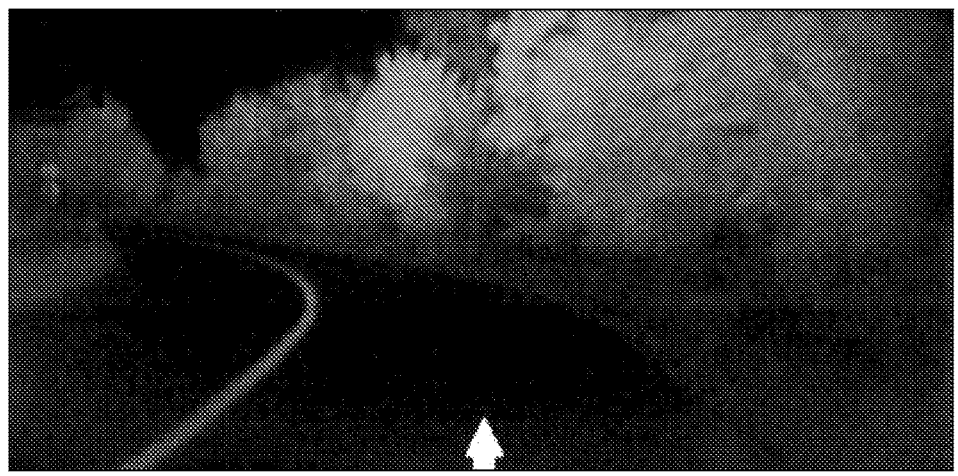
Figure 6A

Figure 7

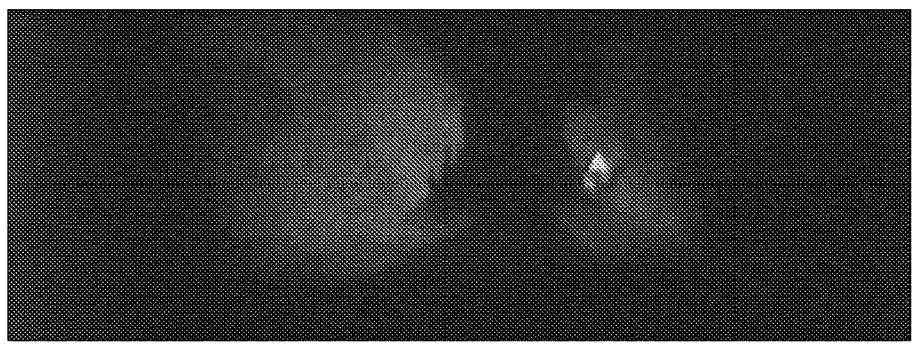
Figure 8

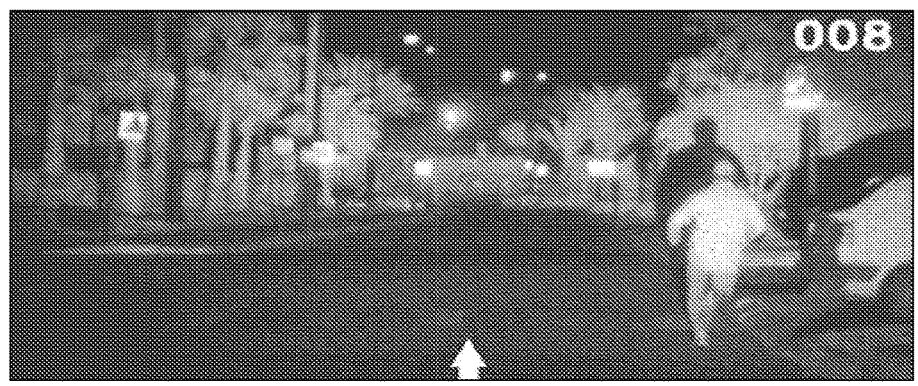
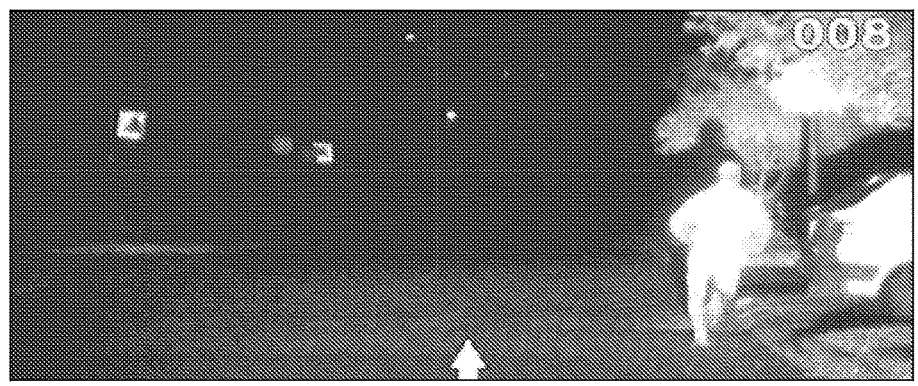
Figure 9

FRAME #1 (ACTIVE FRAME, DAYTIME)
FRAME #2 (PASSIVE FRAME, DAYTIME)
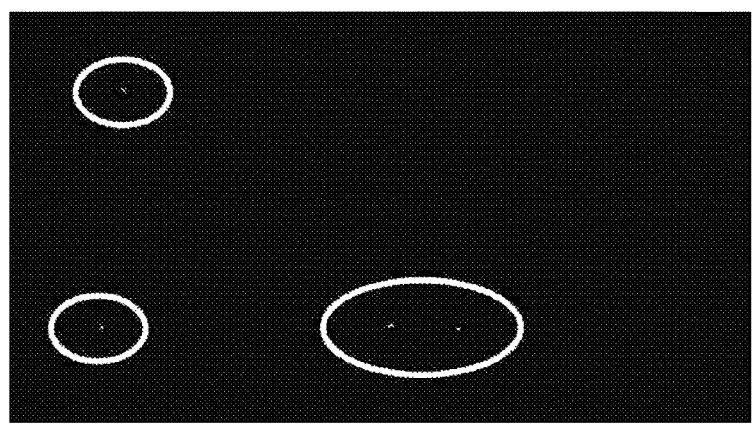
FRAME #3 ("HIGHLIGHTING" HIGHLY REFLECTIVE OBJECTS)
Figure 12

A HIGHLY REFLECTIVE TARGET SIMULATION (DAY TIME)

DEFINITIONS

| | |
|---|---|
| $\mu m : 10^{-6} m$ | MICROMETER |
| $nm : 10^{-9} m$ | MANOMETER |
| $\mu sec : 10^{-6} sec$ | MICRO-SECOND |
| $nsec : 10^{-6} sec$ | MANO-SECOND |
| $c := 3 \cdot 10^8 \frac{m}{sec}$ | SPEED OF LIGHT |

SYSTEM PARAMETERS

| | |
|---|---|
| $\lambda := 800 nm$ | WAVELENGTH |
| $Vis := 10 km$ | VISIBILITY |
| $F_{num} := 1.2$ | SENSOR LENS F# |
| $f := 22 mm$ | SENSOR LENS FOCAL LENGTH |
| $d := 10 \mu m$ | SENSOR PITCH |
| $D := \frac{f}{F_{num}}$ | SENSOR LENS DIAMETER |
| $IFOV := 2 atan\left(\frac{d}{2f}\right)$ | SENSOR IFOV |
| $Toptic := 0.8$ | OPTICAL TRANSMISSION (LENS OR LIGHT SOURCE) |

Figure 13

$r_{target} := 0.3$ — TARGET REFLECTANCE $P_{light} := 500\,\text{watt}$ — LIGHT PEAK POWER $\Theta_{light\_X} := 24\,\text{deg}$ — LIGHT DIVERGENCE (X-AXIS)

$\Theta_{light\_Y} := 8\,\text{deg}$ — LIGHT DIVERGENCE (Y-AXIS)

$\tau_{light} := 0.8$ — OPTICAL TRANSMISSION (LENS)

$t_{gate} := 1\,\mu\text{sec}$ — LIGHT/GATE PULSE FWHM $R := 1\text{m}, 2\text{m} .. 300\text{m}$ — RANGE $\sigma := 100 \cdot \dfrac{\text{m}^2}{\text{rad}^2}$ — RETRO-REFLECTOR CROSS SECTION $r := 0.3$ — REFLECTIVITY

SIMULATION $I(\lambda) = 1.017 \times 10 \dfrac{\text{watt}^2}{\text{m}^2 \cdot \mu\text{m}}$ — SPECTRAL IRRADIANCE OF THE SUN $R_{min} := 10 \cdot \text{m}$ — MINIMAL RANGE $R_0 := 20 \cdot \text{m}$ — START OPTIMAL RANGE $R_{max} := 200 \cdot \text{m}$ — END OPTIMAL RANGE $T_{laser} := 2 \dfrac{R_{max} - R_{min}}{c} \quad T_{laser} = 1.267\,\mu\text{sec}$ — LIGHT SOURCE PULSE LENGTH

Figure 13 (cont. 1)

$$T_{II} := 2 \frac{R_0 - R_{min}}{c} \quad T_{II} = 0.067 \mu sec \quad \text{SENSOR GATE DURATION}$$

$$T_{off} := 2 \frac{R_{min}}{c} \quad T_{off} = 66.667 nsec \quad \text{SENSOR\textbackslash LIGHT SOURCE CLOSE TIME}$$

$$T := T_{laser} + T_{II} + T_{off} \quad T = 1.4 \mu sec \quad \text{CYCLE TIME}$$

CONVOLUTION $$Ir(R) := \frac{\int_{T_{laser}+T_{off}}^{T} L\left(t - \frac{2R}{c}\right) \cdot C(t) dt}{T_{II}}$$

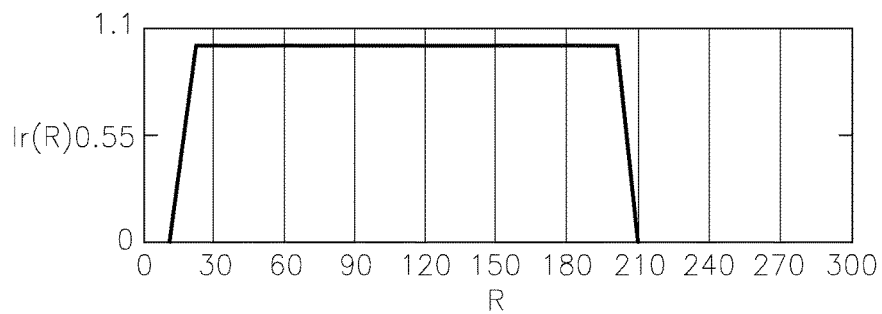

$$\gamma := \frac{-\ln(0.02)}{Vis} \cdot \left(\frac{\lambda}{0.55 \mu m}\right)^{-1.3} \quad \text{ATTENUATION COEFFICIENT}$$

$$\gamma = 0.24 km^{-1}$$

SPECTRAL FILTER WIDTH $$\Delta\lambda := 10nm$$

Figure 13 (cont. 2)

$$IT(R) := \frac{T_{optic}^2 \cdot P_{light} \cdot \sigma}{\Theta_{light\_X} \cdot \Theta_{light\_Y} \cdot R^4} \cdot f(R) \cdot e^{-2\gamma \cdot R} \cdot I_r(R)$$

POWER DENSITY PER SINGLE GATE (LIGHT SOURCE\SENSOR) AS FUNCTION OF RANGE FROM A RETRO-REFLECTOR TARGET POWER $$IB(R) := \frac{T_{optic}^2 \cdot P_{light} \cdot r}{\pi \cdot \Theta_{light\_X} \cdot \Theta_{light\_Y} \cdot R^2 \cdot 4 \cdot F_{num}} \cdot e^{-2\gamma \cdot R} \cdot I_r(R)$$

POWER DENSITY PER SINGLE SENSOR EXPOSURE AS FUNCTION OF RANGE FROM A DIFFUSIVE TARGET $$IBs := \frac{T_{optic} \cdot I(\lambda) \cdot \Delta\lambda \cdot r}{4 \cdot F_{num}^2}$$

POWER DENSITY PER SINGLE SENSOR EXPOSURE AS FUNCTION OF RANGE FROM A DIFFUSIVE TARGET

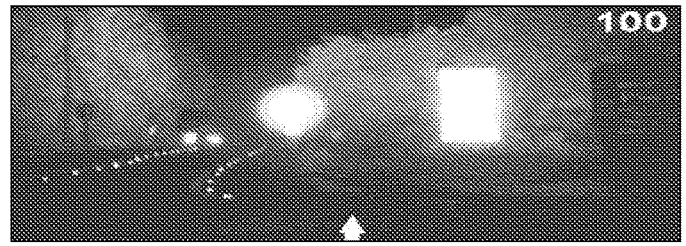
FRAME #1 (NOMINAL FRAME, NIGHTTIME)
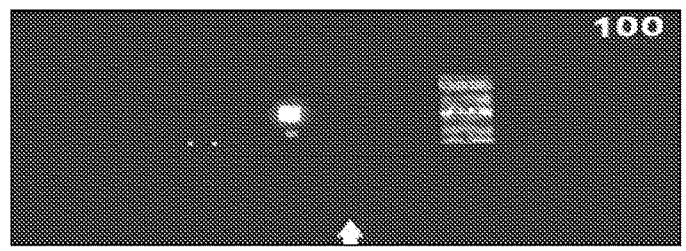
FRAME #2 (ACTIVE FRAME, NIGHTTIME)
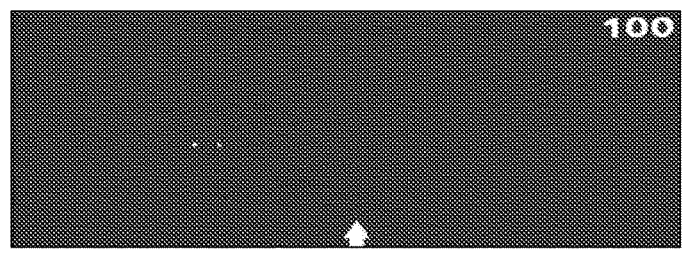
FRAME #3 (PASSIVE FRAME, NIGHTTIME)
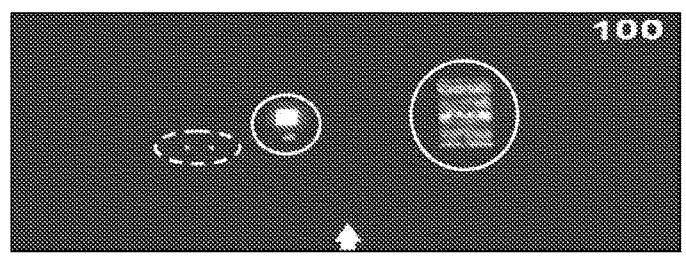
AMBIENT LIGHT SOURCE (LEFT SIDE-OPPOSITE VEHICLE HEADLAMPS)
AND HIGHLY REFLECTIVE OBJECTS (MIDDLE AND RIGHT SIDE)
Figure 14

GATED IMAGING USING AN ADAPTIVE DEPTH OF FIELD

CROSS-REFERENCE TO RELATED APPLICATIONS

This application is a National Phase Application of PCT International Application No. PCT/IL2013/050448, International Filing Date May 23, 2013 entitled "GATED IMAGING USING AN ADAPTIVE DEPTH OF FIELD" claiming priority of U.S. Provisional Patent Application No. 61/652,518, filed May 29, 2012 which is hereby incorporated by reference.

BACKGROUND

1. Technical Field

The present invention relates to the field of imaging enhancement at daytime and nighttime with a gated imaging system using an adaptive depth-of-field in general, and, more particularly, to imaging system applicable for vehicular use and to operation methods implemented in such system.

2. Discussion of Related Art

In U.S. Pat. No. 7,733,464 B2, titled "vehicle mounted night vision imaging system and method" and in U.S. Pat. No. 6,730,913 B2, titled "active night vision system for vehicles employing short-pulse laser illumination and a gated camera for image capture", devices are described for improving visibility conditions in a motor vehicle during low-visibility environment (nighttime or at nighttime with poor visibility conditions such as rain, snow etc.) based on gated imaging. Neither of the references cited above offer any image enhancement for the viewer based on Depth-Of-Field.

BRIEF SUMMARY

According to some embodiments, a method for achieving gated imaging using an adaptive depth of field is provided herein. The method may include the following stages: obtaining boundary conditions associated with a preliminary depth of field (DOF) parameters in a scene; illuminating the scene, using a light source, with a pulsed light beam, based on the specified boundary conditions, by controlling light source parameters; controlling sensor array parameters based on the boundary conditions; capturing, using the sensor array, one or more images of the scene, wherein the capturing is based on one or more exposures synchronized with the pulsed light beam, to achieve gated images of the scene in accordance with the boundary conditions associated with the DOF parameters; analyzing at least one of the captured images, using data processing algorithms, to yield updated DOF parameters; and repeating the illuminating, the controlling, and the capturing with at least one of: updated sensor array parameters and updated light source parameters, based on the updated DOF parameters and updated boundary conditions.

BRIEF DESCRIPTION OF THE DRAWINGS

The present invention will be more readily understood from the detailed description of embodiments thereof made in conjunction with the accompanying drawings of which:

FIG. 5 and FIG. 6 provide examples of gated imaging system automatic obstacle detection outputs according to embodiment of the present invention;

FIG. 6A provides examples of gated imaging system automatic curvature detection outputs according to embodiment of the present invention;

FIG. 7-FIG. 9 provide examples of gated imaging system various Depth-Of-Field imagery according to embodiment of the present invention;

FIG. 12 provides examples of the use of gated imaging system Depth-Of-Field at daytime according to embodiment of the present invention;

FIG. 14 provides examples of the use of gated imaging system Depth-Of-Field at nighttime according to embodiment of the present invention;

DETAILED DESCRIPTION

A gated imaging system at daytime conditions, for nighttime conditions, light-modulated objects imaging (e.g. high repetition light flickering such as traffic sign etc.) and in poor visibility conditions. In addition, to enable target detection (i.e. any type of object such as car, motorcycle, pedestrian etc.) based on a selectively Depth-Of-Field (refereed hereinafter sometimes as "Slice") in real time with an automatic alert mechanism conditions regarding accumulated targets. The gated imaging system may be handheld, mounted on a static and/or moving platform. Gated imaging system may even be used in underwater platforms, ground platforms or air platforms. The preferred platform for the gated imaging system herein is vehicular.

A gated imaging system is described in certain prior art such as patent: U.S. Pat. No. 7,733,464 B2, titled "vehicle mounted night vision imaging system and method". Light source pulse (in free space) is defined as:

$$T_{Laser} = 2 \times \left( \frac{R_0 - R_{min}}{c} \right),$$

where the parameters defined in index below. Gated Camera ON time (in free space) is defined as:

$$T_{II} = 2 \times \left( \frac{R_{max} - R_{min}}{c} \right).$$

Gated Camera OFF time (in free space) is defined as:

$$T_{Off} = \frac{2 \times R_{min}}{c},$$

where c is the speed of light, $R_0$, $R_{min}$ and $R_{max}$ are specific ranges. The gated imaging is utilized to create a sensitivity as a function of range through time synchronization of $T_{Laser}$, $T_{II}$ and $T_{Off}$.

Hereinafter a single "Gate" (i.e. at least a single light source pulse illumination followed by at least a single sensor exposure per a sensor readout) utilizes a specific $T_{Laser}$, $T_{II}$ and $T_{Off}$ timing as defined above. Hereinafter "Gating" (i.e. at least a single sequences of; a single light source pulse illumination followed by a single sensor exposure and a single light source pulse illumination followed by a single sensor exposure ending the sequence a sensor readout) utilizes each sequence a specific $T_{Laser}$, $T_{II}$ and $T_{Off}$ timing as defined above. Hereinafter Depth-Of-Field ("Slice") utilizes at least a single Gate or Gating providing a specific accumulated imagery of the viewed scene. Each DOF may have a certain DOF parameters that includes at least on the following; $R_0$, $R_{min}$ and $R_{max}$.

Figure 1:
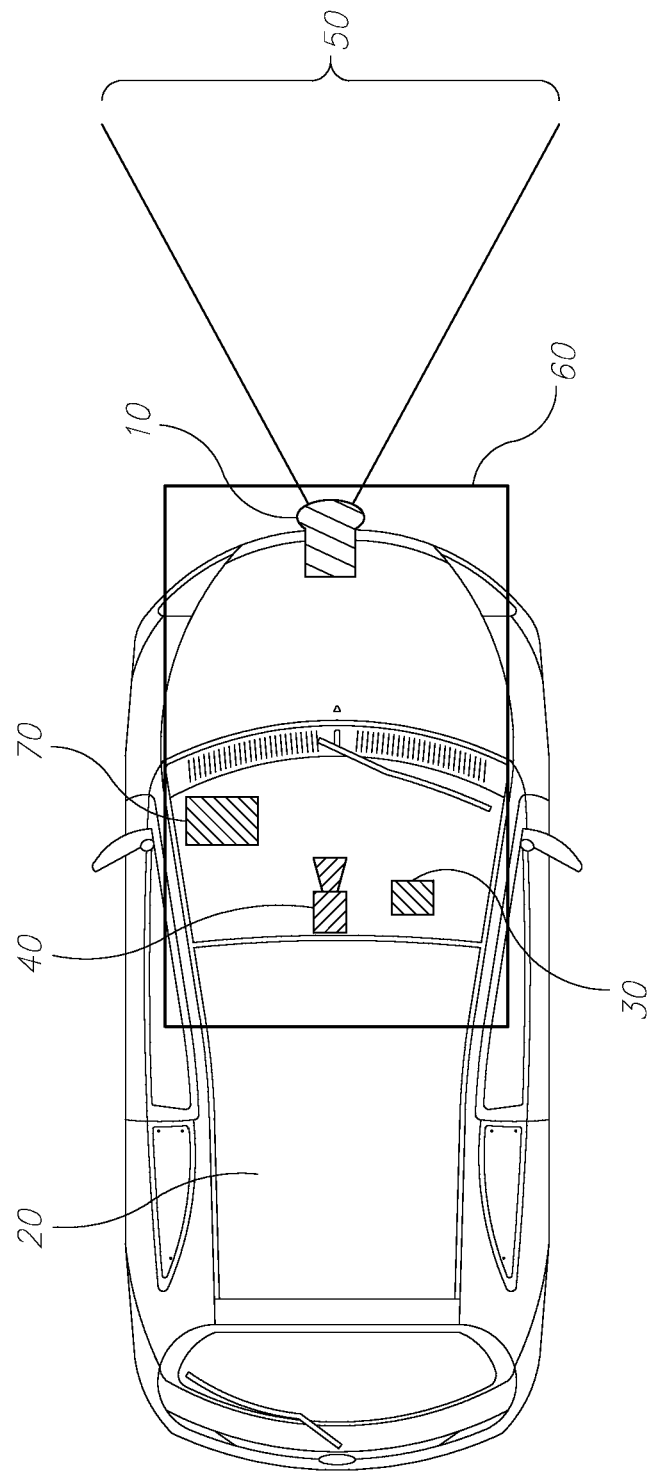
FIG. 1 is a top view illustration of a general view of the gated imaging system installed in a vehicle, according to the present invention.

FIG. 1 illustrates a vehicle 20 mounted gated imaging system 60 which may include a gated source of light 10 in the non-visible spectrum (e.g. NIR by a LED and/or laser source) in order to illuminate 50, for example, the environment in front of the vehicle. Gated imaging system 60 includes a camera (sensor array) 40 adapted for image gating, for example the preferred gated camera may be a Gated Complementary Metal Oxide Semiconductor (GC-MOS). Gated imaging system 60 may also include a system control 30 and driver Human Machine Interface (HMI) 70 such as display, audio alerts and tactile alerts.

Figure 2:
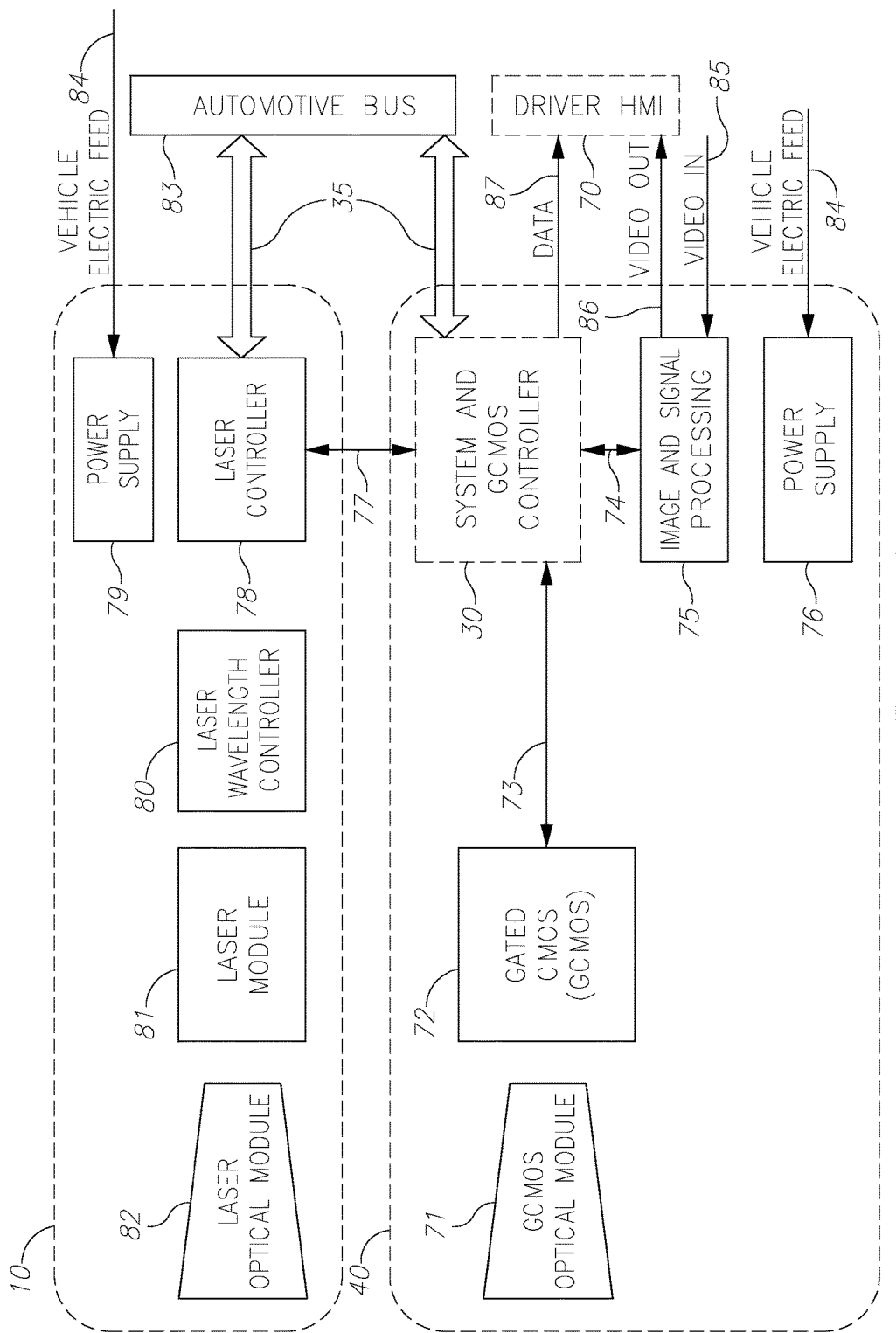
FIG. 2 describes schematically an example of an embodiment of the gated imaging system according to the preferred embodiment of the present invention.

FIG. 2 illustrates gated imaging system 60 internal modules regarding disclosed embodiment. Accordingly, gated imaging camera (sensor array) 40 includes: gated camera/sensor 72. Gated camera/sensor optical module 71 is adapted to operate and detect electromagnetic wavelengths similar to those provided by gated light source 10. Gated camera/sensor optical module 71 is further adapted for focusing incoming light onto light sensitive area of the gated camera/sensor 72. Gated camera/sensor optical module 71 is further adapted for filtering certain wavelength spectrums, as may be performed by a band pass filter and/or adapted to filter various light polarizations. Further, gated camera/sensor 72 adapted and enabled to detect electromagnetic modulation-including a synchronization mechanism adapted for detecting electromagnetic signals, originating from the gated or modulated light source 10. Gated imaging camera (sensor array) 40 further includes an image and signal processing 75, a gated imaging control 30 (may be located separately from gated imaging camera 40), and an electrical interface 35, adapted to interface with the motor vehicle communication bus 83. Gated imaging control 30 provides the gating synchronization of the camera gating/exposures (via control 73) to the gated light source 10 pulses via triggering and control 77 and provides system parameters (via 74) to the image and signal processing 75. System parameters provide to image and signal processing 75 may include vehicle parameters (e.g. vehicle speed, wipers operating etc.) and/or other parameters (e.g. number of pulses/exposures per frame, camera/sensor gain, timing etc.). Image and signal processing 75 may combine (fuse) images from camera/sensor 72 and/or additional images from external sensors via video in 85. Image and signal processing 75 may further provide real-time image processing (computer vision) such as ADAS features (e.g. pedestrian detection, lane departure warning, traffic sign recognition, object range estimation etc.). Additional interfaces are provided such as ADAS features output via vehicle communication bus 35, data interface 87 to the driver HMI 70 and video out 86 of the gated imagining system. The video out 86 may have ADAS features overlay highlighting (e.g. for pedestrian detection warning a bordering rectangular, overlay lines for lane detection warning etc.). Power supply 76 (which is feed via vehicle electrical feed 84) provides gated imaging camera 40 and control 30 the required voltages.

In another embodiment, HMI 70 such as a visual based may include range estimation to imagery targets in the camera Field-Of-View (FOV) based on geometrical considerations and/or gated imagery (i.e. based on specific gating/exposures timing of gated imaging camera 40 and the gated light source 10). Furthermore, visual display of the gated imagery may be based on the velocity of the vehicle 20; where the displayed image is zoomed-in for higher velocities (for example above 50 km per hour) and zoomed-out for lower velocities (for example less than 50 km per hour).

FIG. 2 illustrates also at least a single gated light source 10 in the non-visible spectrum (i.e. 750-2,000 nm) includes light source optical module 82, adapted for projecting and/or filtering light polarization. Light source optical module 82 may further be adapted for diffusing light (e.g. holographic diffuser, optical lenses etc.) and projecting one or more Field Of illumination (FOI). Gated light source 10 further includes a pulsed and/or modulated light source 81 (e.g. LED, LASER, flash lamp, etc.) to provide pulsed illumination or to provide modulated illumination. Gated light source 10 may include a light source wavelength controller 80 based on an electrical method (e.g. thermo electric cooler), and/or suitable mechanical method and/or any optical method and device for stabilizing illumination wavelengths, as appreciated by those having ordinary skill in the art. Gated light source 10 further includes light source controller 78 and power supply 79 which is feed via vehicle electrical feed 84. Light source controller 78 is adapted to drive pulsed or modulated illumination, adapted to control light source wavelength controller 80 and to receive trigger signal from gated imaging control 30. Gated light source 10 may further include communication interface 35 to the vehicle communication bus 83 adapted to control and/or provide built-in-tests status. light source 10 pulse parameters may include; amplitude of the pulse, duration of the pulse, frequency of the pulses, shape of the pulse, phase of the pulse, and duty cycle of the pulses.

Figure 3:
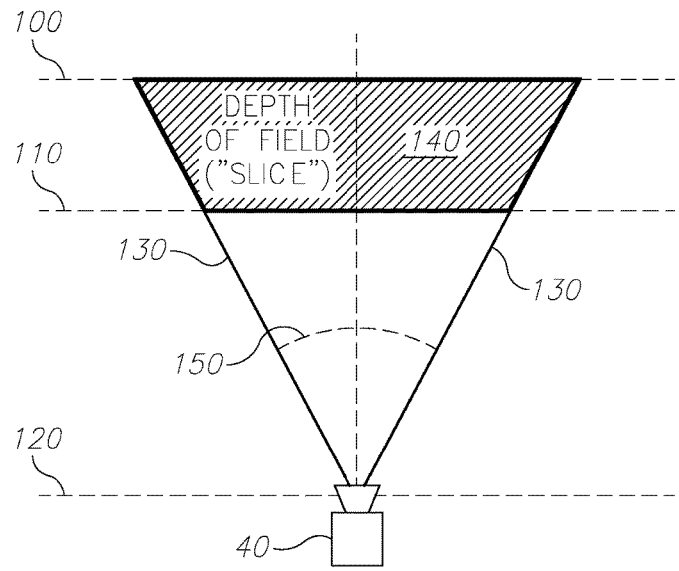
FIG. 3 describes schematically an example of an embodiment of the gated imaging system Depth-Of-Field according to embodiment of the present invention.

FIG. 3 illustrates a gated camera (sensor array) 40 with a FOV 150 mounted on a vehicle at a specific distance 120. Gated light source 10 (not illustrated) illuminates the viewed scenery (outlined by 130 and 100) synchronized to gated camera 40 to provide gating (defined hereinabove). Gated camera (sensor array) 40 may absorb the reflected gated light source energy of the full Depth-Of-Field (outlined by 130 and 100). Gated camera (sensor array) 40 may also accumulate at least a single selectively illuminated scene Depth-Of-Field ("Slice") (140, outlined by 130, 100 and 110) reflection from the non-visible gated source of light. The following table provides an example of the required timing for each Depth-Of-Field.

| Parameter | Full Depth-Of-Field | Selectively Depth-Of-Field ("Slice") |
|---|---|---|
| $R_{max}$ [meters] | 250 | 150 |
| $R_0$ [meters] | 100 | 50 |
| $R_{min}$ [meters] | 20 | 20 |
| $T_{Laser}$ [nsec] | 530 | 200 |
| $T_{II}$ [nsec] | 1530 | 870 |
| $T_{Off}$ [nsec] | 130 | 130 |

Gated imaging system may process the accumulating images in real time, fuse images (with and/or without additional sensors) and automatically alert and/or highlight relevant objects in the viewed scenery (e.g. pedestrian in the vehicle trajectory, yield traffic sign, hole in the road etc.). Gated imaging system may also include a display apparatus to display the system processed and/or un-processed images and/or an audio alert for any system image processed feature.

Gated camera FOV and/or gated source of light may be moved during operation as a function of observed scene. For example, in a scene where the viewed road is upwards the gated system may be rotated upwards and for a right curved road the gated system may be rotated right in a similar angle as the road curvature. Gated system rotation may be controlled via a mechanical construction, an electro-mechanical engine, an electro-optical construction etc.

Figure 4:
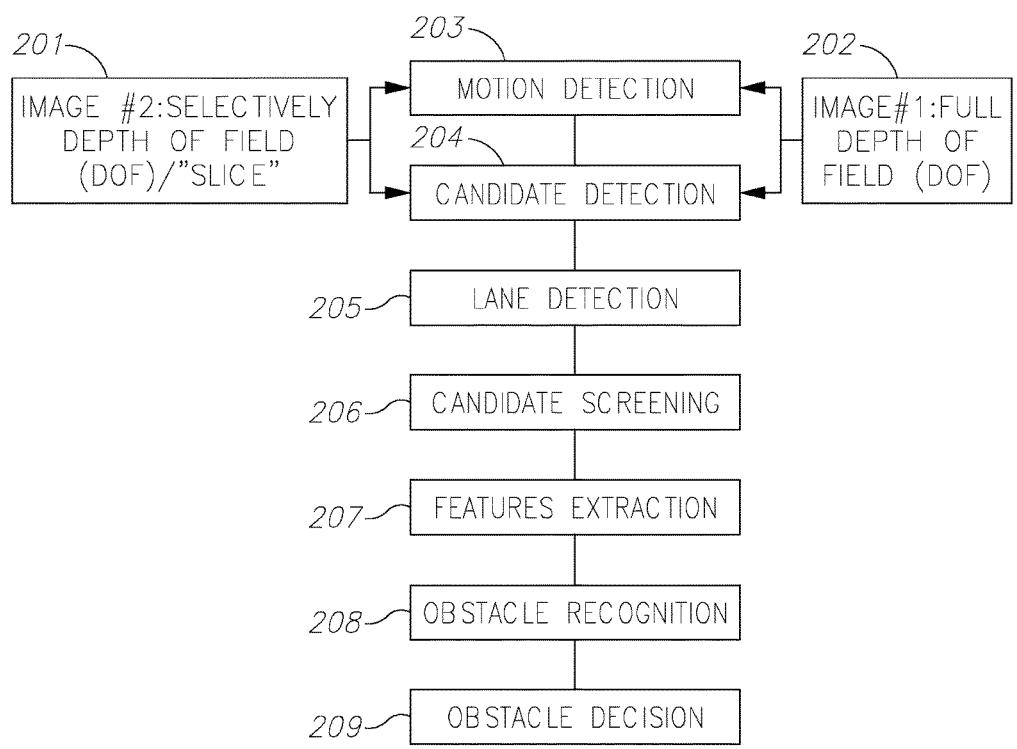
FIG. 4 describes a flow chart of an embodiment of the gated imaging system automatic obstacle detection according to embodiment of the present invention.
Figure 5:
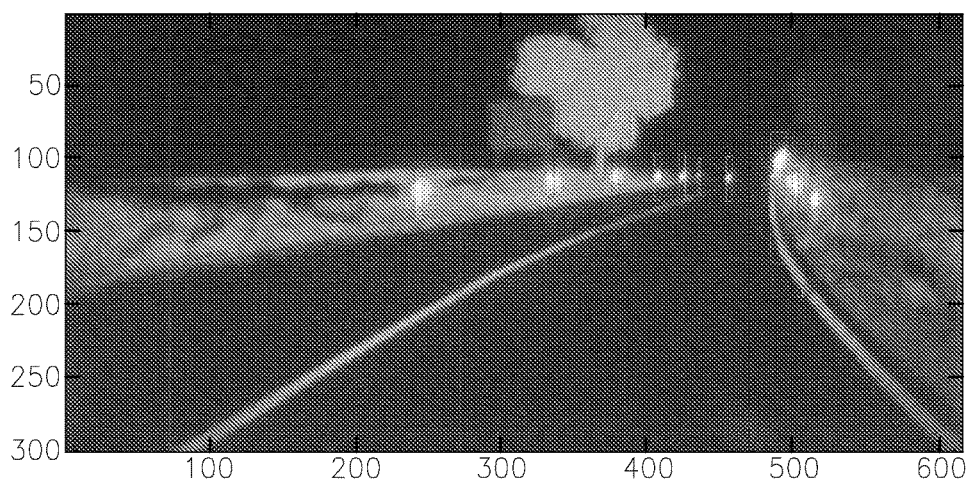

FIG. 4 illustrates a flow chart (200) for automatic target detection process with high Probability Of Detection (POD) and low False Alarm Rate (FAR) for a gated imaging system at nighttime and at nighttime with harsh weather conditions (e.g. rain, snow etc.). The following automatic target detection may even be applicable for low camera target resolution of less than twenty effective target camera pixels (e.g. for a target such as a pedestrian of 1 m high standing 150 m from the system and the camera IFOV≈0.4 mrad providing effective target pixels of about 15). Inputs for the flow chart are at least two images taken with the gated imaging system. First image (Image #1, 202 in FIG. 4) is a full Depth-Of-Field (DOF) image of the scene and the consecutive second image (Image #2, 201 in FIG. 4) is a selectively DOF ("Slice") image of the scene. Motion Detection processing block (203) provides perpendicular and/or parallel target motion detection such as pedestrian walking, cyclist etc. Motion Detection processing block may take into account "Egomotion" (i.e. refers to estimating a camera's motion relative to a rigid scene) motion of the gated imaging platform (e.g. vehicular) as to the viewed scene and extracts the target motion. Candidate Detection processing block (204) provides target extraction by pre-defined features. For example, a pedestrian has a vertical feature which is extracted by a filter responding to vertical edges. Attention is devoted mainly to the road and its nearby road margins (i.e. only relevant targets in the gated system trajectory) which is provided by Lane Detection processing block. Combing the outputs of the above three processing blocks is performed in Candidate Screening processing block (206) providing only the relevant targets. Image #2 in FIG. 4 may be the input for Motion and Candidate Detection processing blocks to provide an additional target screening based on selectively DOF/"Slice" (e.g. a pre-defined segment in the viewed scenery). Image #1 in FIG. 4 (full DOF) is preferred to be the input for Lane Detection processing block (205) as to image #2 (selectively DOF/"Slice") due to the complete scene image enabling lane detection in higher probability of detection with lower false detection. An example for the outputs of several processing blocks of a pedestrian detection flow chart is given in FIG. 5. The input for this processed image is a full DOF image (e.g. image #1 is the input for processing blocks described above). Two border lines are marked by the algorithm in purple color (output of Lane Detection Block), blue/yellow marked rectangles (output of Candidate Detection Block) and yellow marked rectangles (output of Candidate Screening Block but without implementing Motion Detection Block) where candidates external to the lane detection were excluded. Another example for the outputs of several processing blocks of a pedestrian detection flow chart is given in FIG. 6. The input for the upper processed image is a selectively DOF/"Slice" image (e.g. image #2 is the input for processing blocks described above) and the input for the lower processed image is a full DOF image (e.g. image #1 is the input for processing blocks described above). One can notice the advantage of the DOF/"Slice" upper image as regarding the Candidate Screening processing block input. Returning to the flow chart in FIG. 4, Feature Extraction processing block (207) is preformed to provide another target screening layer. This block is designed specifically to each target type features. For example, a pedestrian has a typical width/height ratio, a Cy/length ration where Cy is the Y center of mass of the segment and a crossing leg difference where the maximal difference in the lower part of the segment between two parts of the segment or If a pedestrian is walking his leg form an opposite "V" shape. Obstacle Recognition processing block (208) extracts only targets that comply with Feature Extraction processing block to provide final Obstacle Decision processing block (209) a high POD and low FAR targets detection inputs which are highlighted and/or declared to the driver HMI.

Lane Detection processing block in FIG. 4 may also provide forward road curvature detection based on the gated imagery (full DOF or selectively DOF). This detected information (angle of road curvature and/or distance to road curvature) enables to move vehicle headlamps illumination and/or headlamp illumination shape to assist the driver anticipating his driving path as illustrated in FIG. 6A.

Target detection in the gated imaging system FOV may be conducted by a selectively DOF ("Slice") which is related to the imaging sensor and light source timing region (gating) at nighttime and at nighttime with harsh weather conditions (e.g. rain, snow etc.). For example, implementing a "Slice" (e.g. a segment of the viewed scenery) acts as a virtual scanner where target is accumulated only in a relevant DOF. The "Slice" image enables a better Signal to Noise Ratio (SNR), as to a full DOF image, for object detection (e.g. system image processing, driver naked eyes etc.) due to clutter reduction and object contrast enhancement as to the background. Clutter is considered as background texture as to a target under search. An intense clutter (as to a pedestrian target) may be an urban scenery with a lot of vehicles, poles etc. As an example, the full DOF image of the system is from 25 m up to 250 m and the desired DOF ("Slice") is 150 m to 250 m and another example, the full DOF image of the system is from 25 m up to 250 m and the desired DOF ("Slice") is 25 m to 100 m.

FIG. 7 presents images taken by a gated imaging system: the upper image is taken with full DOF image from 25 m up to 250 m and the bottom consecutive image is taken with a desired DOF ("Slice") of 150 m to 200 m. Two pedestrians on the right side of the road are noticeable in both images, but the clutter in front of the pedestrians (i.e. less than 150 m) and the clutter after the pedestrians (i.e. above 200 m) are lower in the desired DOF ("Slice") image as to the full DOF (i.e. 25 m up to 250 m).

FIG. 8 presents images taken by a gated imaging system: the upper image is taken with full DOF image from 25 m up to 250 m and the bottom consecutive image is taken with a desired DOF ("Slice") of 150 m to 200 m. A pedestrian with an umbrella is crossing the road at a distance of about 75 m, noticeable only in the full DOF image. In this example, the desired DOF ("Slice") image acts as virtual scanner where target (in this example, a pedestrian) may not declared by automatic target detection (as described in flow chart in FIG. 4) due to the fact that the target is not illuminated (e.g. noticeable) in the relevant DOF.

FIG. 9 presents images taken by a gated imaging system: the upper image is taken with full DOF image from 10 m up to 200 m and the bottom consecutive image is taken with a desired DOF ("Slice") of 10 m to 50 m. A pedestrian is running on the right side of the images at a distance of about 25 m, noticeable only in both images. In this example, the desired DOF ("Slice") image has a much lower clutter (i.e. data on the background) than the consecutive full DOF image providing a simpler image input to any automatic or non-automatic pedestrian detection method.

Target detection with a selectively DOF ("Slice") is based on the clutter; hence target optimal reflected signal from a "Slice" shall be accumulated when the gated imaging maximal SNR imagery is received at nighttime and at nighttime with harsh weather conditions (e.g. rain, snow etc.). This method may be performed by the following steps;

Step 1: A target was automatically detected as described above and illustrated in FIG. 4 or detected by some other method. For example, the target detection was performed on camera frame #N.

Step 2: The "Slice" synchronization timing (i.e. parameters which are a function of the gated light source timing and gated camera timing such as $T_{Laser}$, $T_{II}$ and $T_{Off}$) are set to accumulate a specific segment of the DOF where the target may be. Geometrical consideration of the target size and/or location in the gated camera FOV may provide a "first order" distance estimation for the "Slice" timing.

Step 3: Calculate target SNR in accumulated "Slice" image from Step 2 (i.e. target detected in camera frame #N).

Step 4: Adjust "Slice" synchronization timing parameters such as; $T_{Laser}$, $T_{II}$ and $T_{Off}$ to achieve a better target SNR in the next "Slice" accumulated image by means of shortening "Slice" depth and/or by increasing $R_0$ and/or increasing $R_{min}$ and/or reducing $R_{max}$. For example, if a target is detected in Step 1. A "Slice" is defined to accumulate reflected illumination signal from a distance of 100 m to 200 m as described in Step 2. If the calculated target SNR (Step 3) is lower than the previous target SNR of Step 1 adjust the next "Slice" to accumulate reflected illumination signal from a distance of 100 m to 150 m or from 150 m to 200 m etc.

Step 5: Return to Step 3 and so on.

The gated imaging system may process and/or display and/or detect targets only in a desired DOF ("Slice") which is related to the vehicle speed and/or the viewed scenery road geometrics and/or road conditions. Vehicle speed may be provided by GPS and/or via vehicle communication bus and/or based on gated imaging system imagery change between accumulated images. Road geometrics may be provided by curve detection as described in FIG. 4 flow chart and/or by GPS location as related to map. For example, in road geometrics DOF ("Slice") dependent case at nighttime and at nighttime with harsh weather conditions (e.g. rain, snow etc.), where a DOF ("Slice") will be 150 m to 250 m for a straight road and DOF ("Slice") will be 25 m to 150 m for a curved road. For another example, in road conditions DOF ("Slice") dependent case, where DOF ("Slice") will be 150 m to 250 m for a dry road and DOF will be 25 m to 150 m for a wet road. A wet road and/or oil spill may be detected due to mirror reflectance behavior or by other external indications such as vehicular rain sensor (applicable for wet road) and/or from weather broadcasting (applicable for wet road). This method enables to reduce irrelevant clutter (data) to the driver and/or the system imaging processing and to highlight potential hazards to the driver.

Figure 10:
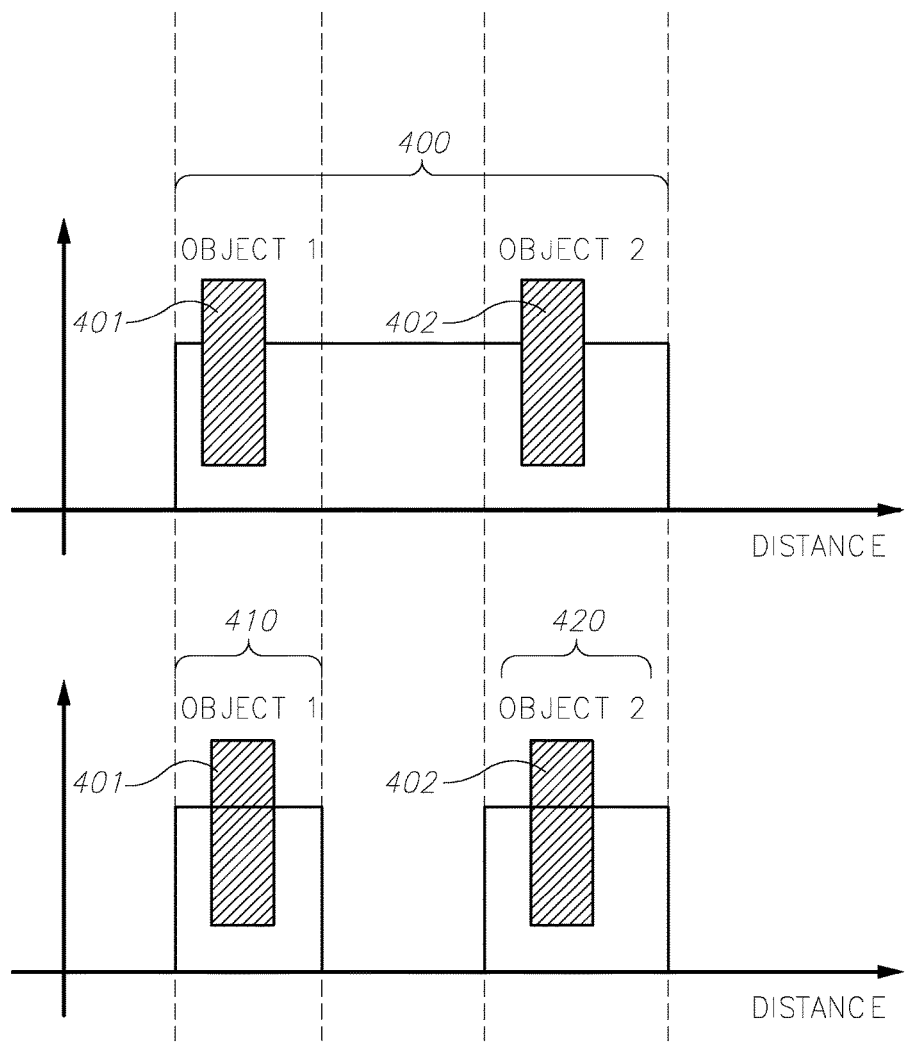
FIG. 10 and FIG. 11 describe schematically an example of an embodiment of the gated imaging system target range estimation according to embodiment of the present invention.
Figure 11:
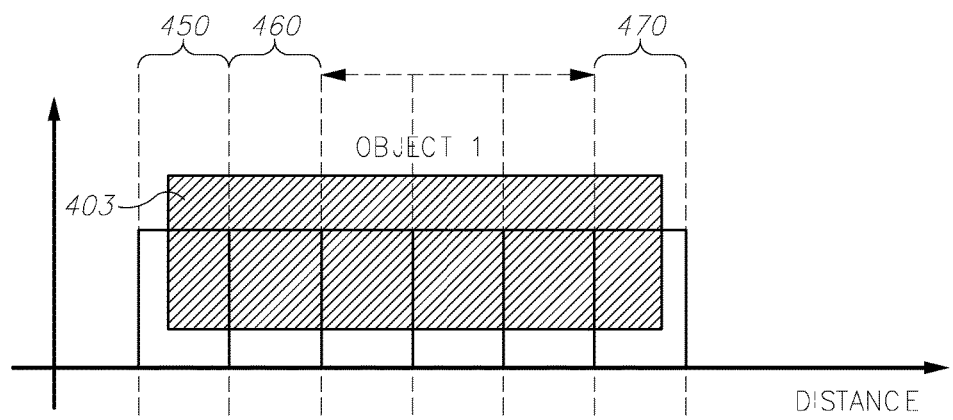

FIG. 10 and FIG. 11 illustrate a method of estimating target distance by a gated imaging system at nighttime and at nighttime with harsh weather conditions (e.g. rain, snow etc.). The gated imaging system may process at least one selectively DOF ("Slice") for each accumulated frame to estimate distance of objects of the viewed and illuminated scenery, which is related to the gated camera and gated light source synchronization timing region (gating). For example, a specific gating sequence is directly related to a specific selectively DOF ("Slice"). The distance estimation is based on the light source pulse raise & fall time and the gated camera GCMOS shuttering capabilities (ON & OFF duration); hence as faster these parameters are the distance estimation is more accurate.

FIG. 10 illustrates in the upper part two objects (targets, 401 and 402) in a single DOF ("Slice", 400) in a single frame/image. On the lower part the same two objects (targets, 401 and 402) with two different DOF's ("Slices", 401 and 402) in a different single frame/image.

FIG. 11 illustrates a single object (target, 403) in multiple different DOF's ("Slices", 450, 460 and 470). Based on each DOF specific synchronization timing $R_0$ and/or $R_{min}$ and/or $R_{max}$ can be extracted. For example, a light source with a raise/fall time of the order of 50 nsec convoluted with the gated camera with a gate ON/OFF time of the order of 50 nsec may provide DOF range estimation of the order of ±15 m.

Figure 13:
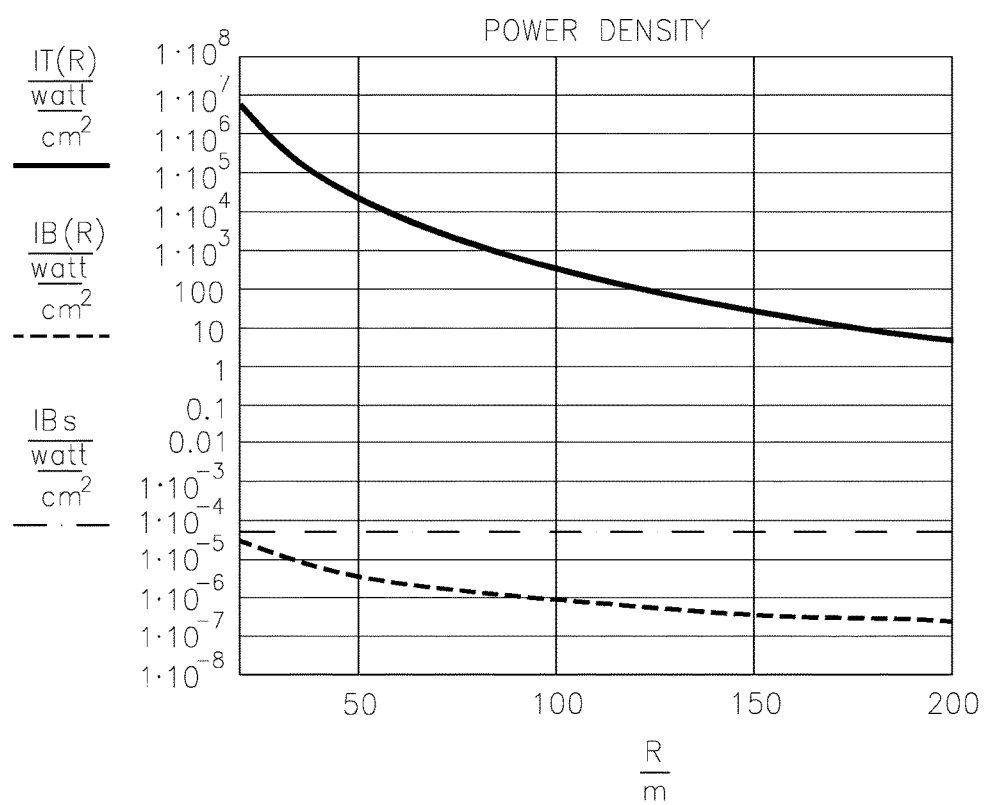
FIG. 13 shows formulation and units used in a simulation of an exemplary implementation in accordance with some embodiments of the present invention.

The gated imaging system may detect and/or estimate distances and/or types of objects during daytime and/or nighttime and/or poor visibility conditions. This is directly related to the possibility to have a selectively DOF ("Slice") based on at least a single light source pulse and gate sequence (gating) per read-out frame. This method may utilize the high intensity illumination light source peak power reflection in the viewed scenery. Highly reflective objects (i.e. not diffusive targets such as lambertian) may be detected in this technique such as retro-reflectors in traffic signs, vehicle retro-reflector lights and/or retro-reflector stickers, traffic lightings retro-reflectors etc. The intensity illumination from retro-reflection can be on the order of three magnitudes more than a diffusive reflection, enabling a good gated imaging system signal to background signal ratio even at daytime light conditions (i.e. high irradiance due to the sun). This method provides "Highlighting" relevant targets from the background enabling faster and simpler relevant distance estimation based on geometrical consideration and\or other methods. The method may be as follows (with an example of a calculation illustrated in FIG. 13):

Frame #1 (Active frame): At least a single light source pulse and camera gate sequence (gating) per single read-out frame. The at least single light source pulse and camera gate sequence (gating) is performed as close as possible to the end of Frame #1 duration. The at least single light source pulse must be with a peak power higher from the ambient irradiance at the relevant wavelength. An example of this Frame #1 is shown in FIG. 12.

Frame #2 (Passive frame): A single camera gate without a light pulse per single read-out frame consecutive to Frame #1. The single gate without a light pulse is performed as close as possible to the beginning of Frame #2 duration. By this method, Frame #1 (Active frame) and Frame #2 (Passive frame) accumulate similar ambient light if the camera gate duration is identical for both frames. An example of this Frame #2 is shown in FIG. 12.

Frame #3 ("Highlighting" Highly reflective objects). Subtract Frame #1 from Frame #2 and setting a signal threshold. This method eliminates the ambient light background exposing the highly reflective objects in the scenery. The timing (i.e. location in each frame) of sensor gate/light pulse in Frame #1 and sensor gate in Frame #2 provides a better target SNR due to the proximity of these events which provide a relatively similar accumulated background signal in each frame. An example of this Frame #3 is shown in FIG. 12.

"Highlighting" relevant targets from the background by coupling this acquired data (i.e. highly reflective objects in the scenery) in the image. For example, traffic signs, vehicular light retro-reflectors, vehicular plate number etc. An example of "Highlighting" relevant targets in Frame #3 is shown in FIG. 12.

Target type detection: based on the reflectance behavior of the targets, the target type is deduced (lambertian, retro-reflector or an ambient light source).

Target range estimation: perform range estimation algorithms only on regions with "Highlighted" targets. A range estimation algorithm based on geometric consideration may be based on a pre-known distance between the vehicle retro-reflectors and/or vehicle plate size and/or distance between rear vehicle lights etc. Based on the example of "Highlighted" vehicle rear retro-reflectors detection in Frame #3 as shown in FIG. 12 the range estimation is 42.8 m (less than 5% error from measured value). Additional parameters for this range estimation; distance between vehicle rear retro-reflectors is 1.1 m and gated camera IFOV≈0.45 mrad.

The gated imaging system may detect and/or estimate distances and/or types of objects during nighttime and/or poor visibility conditions at nighttime. This is directly related to the possibility to have a selectively DOF ("Slice") based on at least a single light source pulse and gate sequence (gating) per sensor read-out frame. This method may utilize the high intensity illumination light source peak power reflection in the viewed scenery. Highly reflective objects (i.e. not diffusive targets such as lambertian) may be detected in this technique such as retro-reflectors in traffic signs, vehicle retro-reflector lights and/or retro-reflector stickers, traffic lightings retro-reflectors etc. The intensity illumination from retro-reflection can be on the order of three magnitudes more than a diffusive reflection, enabling a good gated imaging system Signal to Noise Ratio (SNR). This method provides "Highlighting" relevant targets from the background enabling faster and simpler relevant distance estimation based on geometrical consideration and\or other methods. The method is illustrated in FIG. 14:

Frame #1 (Nominal frame): At least a single light source pulse and camera gate sequence (gating) per read-out frame. Typically this image is based on several gate sequences per single read-out frame on the order of 1000 gates. An example of this Frame #1 is shown in FIG. 14.

Frame #2 (Active frame): At least a single light source pulse and camera gate sequence (gating) per single read-out frame consecutive to Frame #1. The at least single light source pulse and camera gate sequence (gating) is performed as close as possible to the end of Frame #1 duration. Typically this image is based on several gate sequences per single read-out frame on the order of 10 gates. An example of this Frame #2 is shown in FIG. 14.

Frame #3 (Passive frame): A single camera gate without a light pulse per single read-out frame consecutive to Frame #2. The single gate without a light pulse is performed as close as possible to the beginning of Frame #2 duration. By this method, Frame #2 (Active frame) and Frame #3 (Passive frame) accumulate similar imagery in both images. An example of this Frame #3 is shown in FIG. 14.

Target type detection: based on the reflectance behavior of the targets (Frame #2 and Frame #3) the target type is deduced (lambertian, retro-reflector or an ambient light source). Examples of different targets are shown in FIG. 14.

Target range estimation: perform range estimation algorithms only on regions with pre-defined characteristics such as lambertian targets, retro-reflector targets or ambient light source targets. A range estimation algorithm based on geometric consideration may be based on a pre-known distance between the vehicle retro-reflectors and/or vehicle plate size and/or distance between rear vehicle lights etc. Based on the example in FIG. 12 the range estimation to the opposite vehicle is 110 m (less than 10% error from measured value). Additional parameters for this range estimation; distance between opposite vehicle headlamps is 1.5 m and gated camera IFOV≈0.45 mrad.

Figure 15:
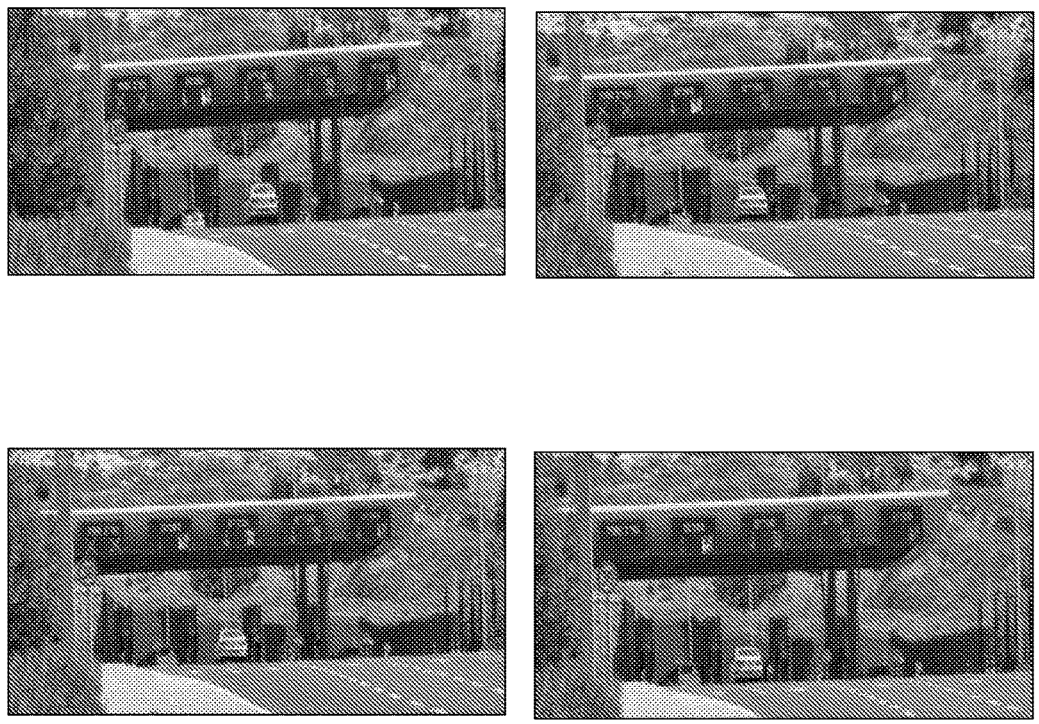
FIG. 15 provides examples of traffic sign modulating light source at daytime according to embodiment of the present invention.

FIG. 15 illustrates four consecutive images taken with an un-gated camera at daytime. These images illustrate a problem of capturing different parts of a light-modulated target (in this case a traffic sign in the upper part of the images) in each image due to the light Pulse-Width-Modulation (PWM). The gated imaging system provides imaging of a light-modulated or pulsed object imaging (e.g. high repetition light flickering traffic sign etc.) in the gated imaging camera FOV.

Figure 16:
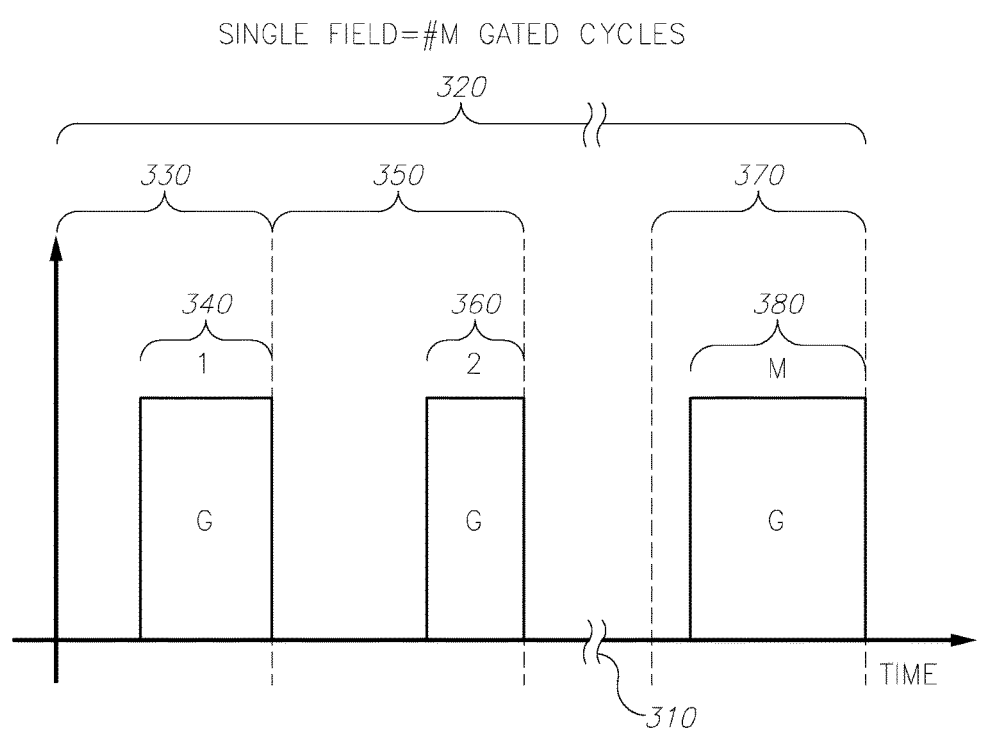
FIG. 16 describes schematically an example of an embodiment of the gated imaging system gating region without the system gated light source according to embodiment of the present invention.

FIG. 16 illustrates a technique to utilize the gated imaging camera 40 without the need of the gated light source. By "locking" on the modulation frequency (e.g. opening specific gates and probing for a signal which is directly related to the modulation frequency of the light source) and/or by system camera multiple gates (noted by "G") with different length time exposures 340, 360 and 380 (i.e. without "knowing" modulation frequency of the light source) in different timing sequence (330, 350 and 370) per sensor frame (320) read-out. Indication 310 represents a certain timing sequence in the gated camera 40 cycles.

Figure 17:
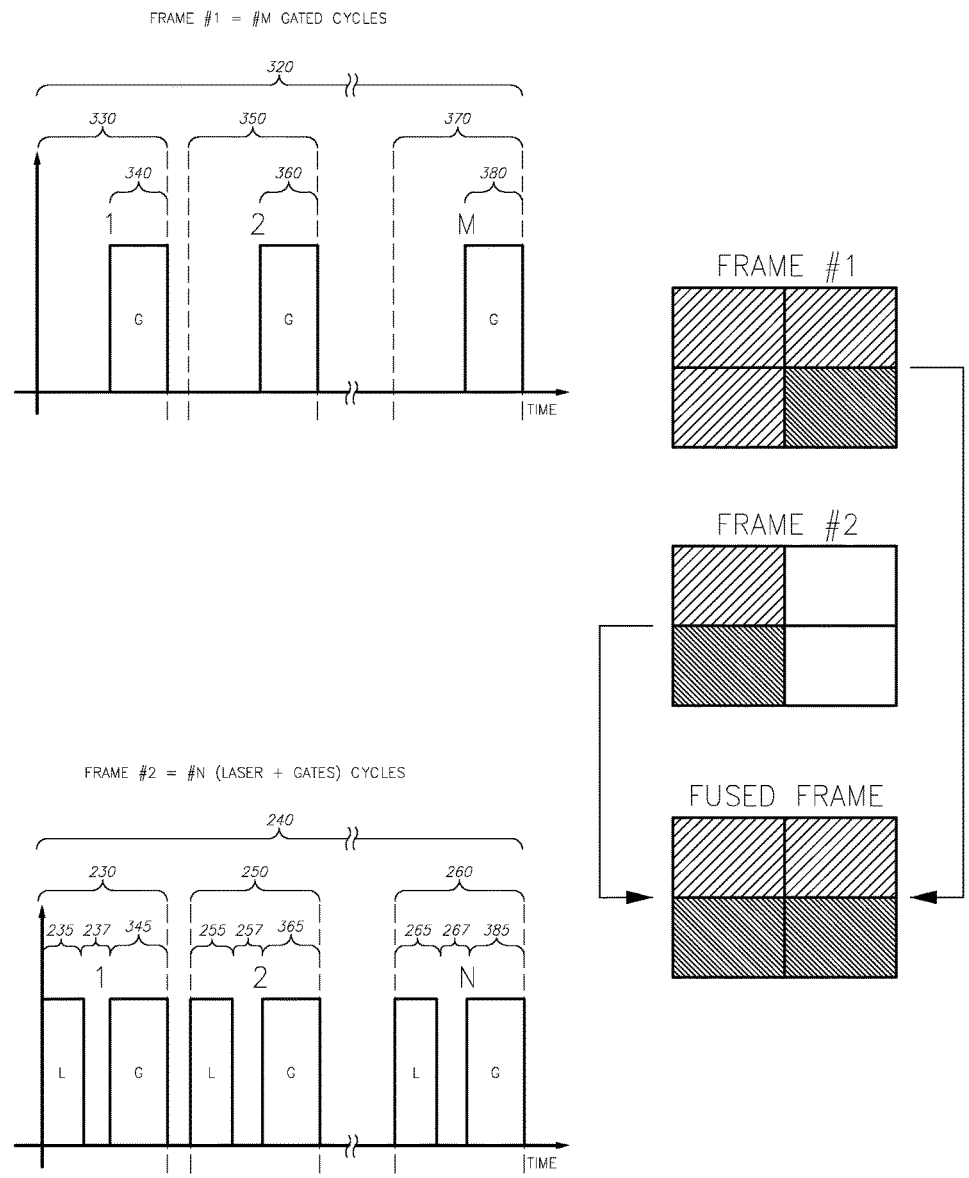
FIG. 17 describes schematically an example of an embodiment of the gated imaging system gating region with and without the system gated light source according to embodiment of the present invention.
Figure 18:
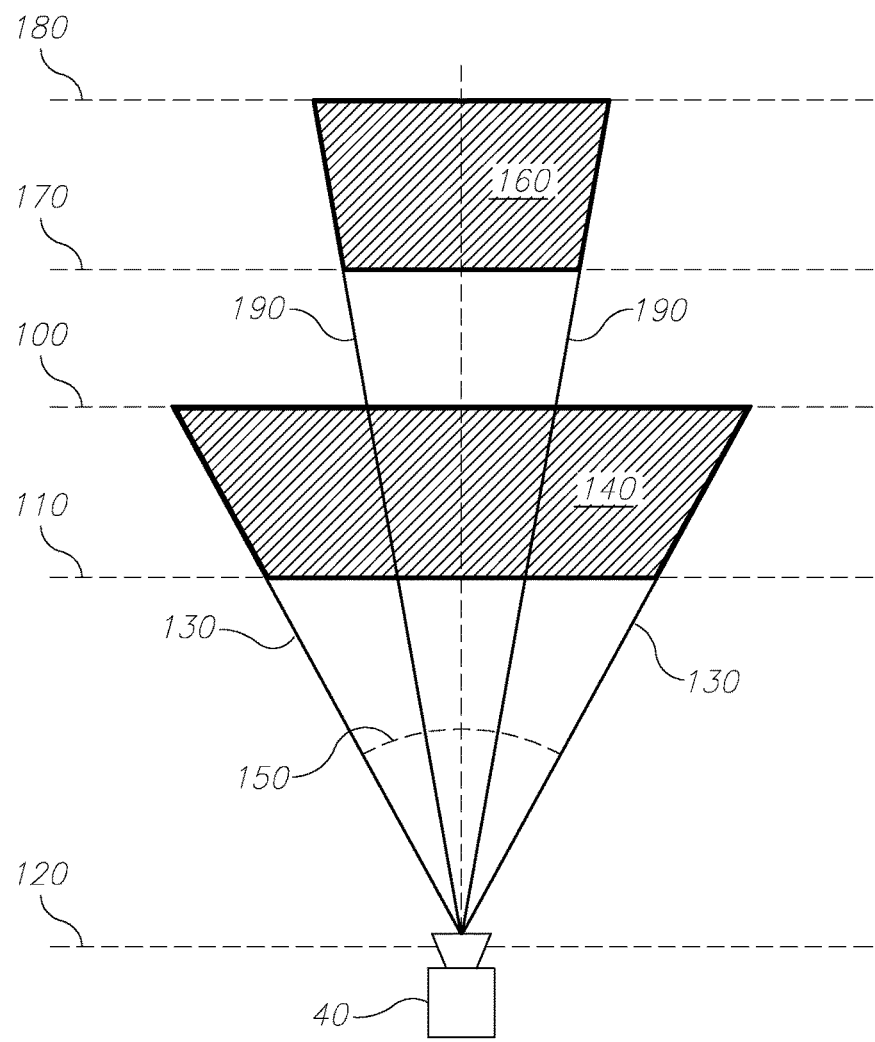
FIG. 18 describes schematically an example of an embodiment of the gated imaging system multiple light source field of illumination and multiple Depth-Of-Field according to embodiment of the present invention.

FIG. 17 illustrates a method in which the gated imaging system 60 may process and/or fuse and/or display fused images from at least two images (frames) which may be from the system and/or without the system light source illumination and/or with additional imaging sensors (e.g. thermal sensors, CMOS, CCD etc.). Frame #1 in FIG. 17 is a Passive frame (similar to Frame #3 in FIG. 14) without use of light source and Frame #2 in FIG. 17 is an Active frame (similar to Frame #1 or Frame #2 in FIG. 14). Active frame may have a timing sequence: illumination pulse followed by a certain delay with a sensor exposure (hence, gating as defined above). Illumination pulses (noted by "L") may have different duration (235, 255 and 265) followed by delay (237, 257 and 267). Sensor different exposure durations (345, 365 and 385) in different timing sequence (230, 250 and 670) up to N cycles per sensor frame (240) read-out. Indication 310 represents a certain timing sequence in the gated camera 40 cycles. Fusing Passive frame and Active frames provides a fused frame with an enhanced image.

Gated camera, such as that based on a GCMOS and alike, gating (light accumulation) timing may be different from each pixel to another or from each array (several pixels or pixels cluster) to another in the GCMOS. This method enables each gated pixel (or gated array) to accumulate different DOF's ("Slices"). This is accomplished by controlling each pixel or pixels cluster triggering mechanism.

Such a gated imaging system might overcome the problems of imaging sensor blooming during high intensity ambient light level (e.g. during daytime, high or low front headlight of incoming vehicle during nighttime etc.) by short gates (i.e. exposure time\light accumulating) of the gated camera which are directly related to lowering the numbers of gates per frame read-out and/or narrowing the gates length time and/or lowering the gated camera gain. Blooming may also be dealt in the gated camera, such as GCMOS and alike, by a high anti-blooming ratio between each pixel to another (i.e. reducing signal diffusion overflow from pixel to neighboring pixel). For example enabling a dynamic range of 110 dB between frame to consecutive frame where the first frame has a single exposure of 50 nsec and the consecutive frame has a single exposure of 16 msec.

Gated light source 10 may have more than one Field-Of-Illumination (FOI)/opening angle with at least a single gated camera 40 with a FOV 150, as illustrated in For example, a wide FOI/opening angle (outlined by 130 and 100) for the close gated imaging distance (e.g. a FOI of 24 deg horizontal by 8 deg vertical illuminating up to 100 m) and a second narrow FOI/opening angle (outlined by 190 and 180) for the long gated imaging distance (e.g. a FOI of 8 deg horizontal by 8 deg vertical illuminating from 100 m to 200 m). Returning to the above example, with a single wide FOI illuminating up to 200 m will require about 400% more energy than the dual FOI. This method reduces the power consumption of the gated light source as to a single FOI illumination while preserving short and long distance various functions as described hereinabove. Each FOI (opening angle) may utilize at least a single different DOF, for example; narrow FOI may have a DOF (160, outlined by 190, 170 and 180) from 150 m to 250 m and wide FOI (140, outlined by 130, 110 and 100) may have a DOF from 10 m to 100 m. This technique provides the viewer and/or the system automatic detection an advantage to versus other imaging systems where the FOI is constant and/or the DOF is limited to the single FOI angle. In addition, each gated imaging FOI may have a different electro-optics characteristics such as; different spectral width and/or different polarization and/or different gating timing (i.e. $T_{Laser}$, $T_{II}$ and $T_{Off}$) and/or gated light source pulse shape (i.e. raise/fall time). This enables the gated system to provide another layer of accumulated data/signal of the viewed sign.

Figure 19:
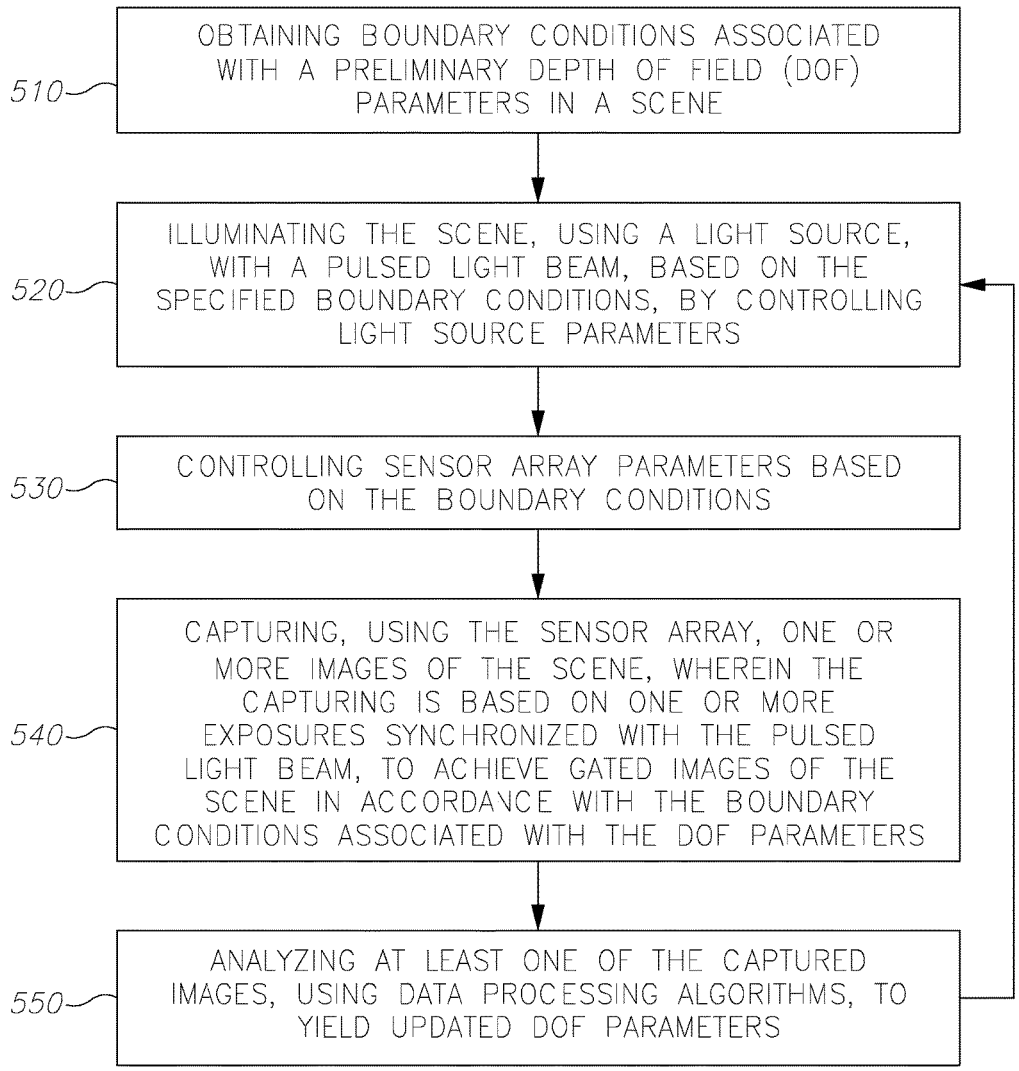
FIG. 19 describes a flow chart of an embodiment of the gated imaging system adaptive Depth-Of-Field ("Slice") determination according to embodiment of the present invention.

FIG. 19 illustrates a flow chart (500) for gated imaging system adaptive DOF process. In Step 510 obtaining boundary conditions (such as; platform velocity, terrain geometry, topography, scene visibility, type of objects required to detect in the DOF etc.) associated with a preliminary DOF parameters (i.e. a certain $R_0$, $R_{min}$ and $R_{max}$) in a scene. In Step 520 and Step 530 the specified DOF (may be more than one per a single readout sensor array frame) is set ($T_{Laser}$, $T_{II}$ and $T_{Off}$) by controlling the gated light source parameters (e.g. opening angle and pulse parameters such as; amplitude of the pulse, duration of the pulse, frequency of the pulses, shape of the pulse, phase of the pulse, and duty cycle of the pulse, etc.) and the gated camera (sensor array) parameters (e.g. gain, duration of the exposure, frequency of the exposures, raise/fall time of the exposure, polarization of the accumulated pulse, and duty cycle of the exposures). In Step 540, at least a single gated image is captured in the gated camera (sensor array) in accordance with the boundary conditions associated with the DOF parameters. In Step 550, the specified DOF ("Slice") is adjusted/updated based on the at least one of the captured images analyzed and/or boundary conditions (that may have changed).

The invention claimed is:

1. A method of imaging a scene in real time from a moving platform comprising:
   obtaining boundary conditions associated with preliminary depth of field (DOF) parameters in a scene, the boundary conditions including platform velocity;
   illuminating the scene, using a light source, with a pulsed light beam, based on the boundary conditions, by controlling light source parameters;
   controlling sensor array parameters based on the boundary conditions;
   capturing, using the sensor array, one or more images of the scene, wherein the capturing is based on one or more exposures synchronized with the pulsed light beam, to achieve one or more gated images of the scene in accordance with the boundary conditions associated with the DOF parameters;
   analyzing at least one of the captured images, using data processing algorithms, to yield updated DOF parameters; and
   repeating the obtaining, the illuminating, the controlling, and the capturing with at least one of: updated sensor array parameters and updated light source parameters, based on the updated DOF parameters and updated boundary conditions.

2. The method according to claim 1, wherein the light source parameters comprise: pulse parameters of the pulsed light beam and field of illumination.

3. The method according to claim 2, wherein the pulse parameters comprise at least one of: amplitude of the pulse, duration of the pulse, frequency of the pulses, shape of the pulse, phase of the pulse, and duty cycle of the pulses.

4. The method according to claim 2, wherein the analyzing further comprises estimating a distance of at least one specified object within the DOF of the scene from the sensor array, by analyzing the reflections from the specified object in view of the intensity level and field of illumination of the light beam directed at the specified object.

5. The method according to claim 1, wherein the boundary conditions further comprise at least one of: terrain geometry, topography, scene visibility, and type of objects required to be detected.

6. The method according to claim 1, wherein the sensor array parameters comprise at least one of: gain, duration of the exposure, frequency of the exposures, raise/fall time of the exposure, polarization of the accumulated pulse, and duty cycle of the exposures.

7. The method according to claim 1, wherein the method is carried out during daytime, and wherein the intensity levels of the light source pulse is sufficient to overcome a daylight level, so that reflections from the objects with a DOF of the scene are distinguishable in the analyzing.

8. The method according to claim 1, wherein the illuminating is carried out by illuminating the scene using at least two light beams, one being a narrow angle and one being a wide angle.

9. The method according to claim 1, wherein the illuminating is carried out by illuminating the scene using at least two light beams, one being a narrow angle and one being a wide angle captured at the same frame.

10. The method according to claim 1, wherein the capturing is carried out with two or more different DOF parameters.

11. The method according to claim 1, wherein at least some objects in the scene are retro-reflective and wherein at least some objects in the scene are diffusively reflective, and wherein the analyzing is carried out so as to distinguish between the retro-reflective objects and the diffusively reflective objects by setting a threshold for intensity of reflected light levels and comparing intensity of reflections from the objects to the threshold.

12. A gated imaging system for generating an image of a scene in real time from a moving platform, the system comprising:
 a pulsed light source;
 a sensor array; and
 a computer processor;
 wherein the pulsed light source is configured to receive specified boundary conditions for a depth of field (DOF) in the scene and illuminate the scene with a pulsed light beam based on the specified boundary conditions by controlling pulse parameters of the pulsed light beam and an opening angle thereof, the boundary conditions including platform velocity;
 wherein the computer processor is configured to control the parameters of the sensor array based on the boundary conditions,
 wherein the sensor array capture one or more images of the scene, wherein the capturing is based on one or more exposures synchronized with the pulsed light beam, to achieve gated images of the scene at the specified boundary conditions;
 wherein the computer processor is configured to analyzing at least one captured image, using data processing algorithms, to yield analyzed slice parameters; and
 wherein the pulsed light source, the sensor array, and the computer processor are configured to repeat the illuminating, the controlling, and the capturing with updated parameters based on the analyzed slice parameters and updated boundary conditions.

13. The system according to claim 12, wherein the specified boundary conditions further comprise at least one of: terrain geometry, topography, scene visibility, and type of objects in the slice.

14. The system according to claim 12, wherein the pulse parameters comprise at least one of: amplitude of the pulse, duration of the pulse, frequency of the pulses, shape of the pulse, phase of the pulse, and duty cycle of the pulse.

15. The system according to claim 12, wherein the sensor array parameters comprise at least one of: gain, duration of the exposure, frequency of the exposures, raise/fall time of the exposure, polarization of the accumulated pulse, and duty cycle of the exposures.

16. The system according to claim 12, wherein the system is operating during daytime, and wherein the intensity levels of the light source pulse is sufficient to overcome daylight level, so that reflections from the objects in the scene are distinguishable in the analyzing.

17. The system according to claim 12, wherein the analyzing further comprises estimating a distance of at least one specified object in the scene from the sensor array, by analyzing the reflections from the specified object in view of the intensity level and opening angle of the light beam directed at the specified object.

18. The system according to claim 12, wherein the illuminating is carried out by illuminating the scene with at least two light beams, one being narrow angle and one being wide angle.

19. The system according to claim 12, wherein the illuminating is carried out by illuminating the scene with at least two light beams, one being narrow angle and one being wide angle captured in the same sensor array frame.

20. The system according to claim 12, wherein the illuminating is changed over time with variable intensity levels and illuminating angles so that the analyzing is carried out at a variable depth of field within the scene.

21. The system according to claim 12, wherein at least some objects in the scene are retro-reflective and wherein at least some objects in the scene are diffusively reflective, and wherein the analyzing is carried out so as to distinguish between the retro-reflective objects and the diffusively reflective objects by setting a threshold for intensity of reflected light levels and comparing intensity of reflections from the objects to the threshold.

* * * * *